United States Patent
Bogle

(10) Patent No.: US 9,016,458 B2
(45) Date of Patent: Apr. 28, 2015

(54) BULK-PRODUCT CONVEYOR WITH SENSOR

(75) Inventor: David W. Bogle, Round Rock, TX (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/130,836

(22) PCT Filed: Jul. 5, 2012

(86) PCT No.: PCT/US2012/045572
§ 371 (c)(1),
(2), (4) Date: Jan. 3, 2014

(87) PCT Pub. No.: WO2013/015961
PCT Pub. Date: Jan. 31, 2013

(65) Prior Publication Data
US 2014/0158497 A1    Jun. 12, 2014

Related U.S. Application Data

(60) Provisional application No. 61/511,789, filed on Jul. 26, 2011.

(51) Int. Cl.
*B65G 43/00* (2006.01)
*B65G 43/08* (2006.01)
*B65G 15/42* (2006.01)
*B65G 15/00* (2006.01)

(52) U.S. Cl.
CPC ............... *B65G 43/08* (2013.01); *B65G 15/42* (2013.01); *B65G 15/00* (2013.01); *B65G 2201/0202* (2013.01)

(58) Field of Classification Search
CPC ...................................................... B65G 43/08
USPC ............................. 198/341.07, 502.1, 810.01
See application file for complete search history.

(56) References Cited

U.S. PATENT DOCUMENTS

| | | |
|---|---|---|
| 6,866,417 B2 | 3/2005 | Gunawardena et al. |
| 7,635,060 B2 | 12/2009 | Lagneaux |
| 8,397,904 B2 | 3/2013 | Bogle |
| 2005/0090011 A1 | 4/2005 | DuPlessis |
| 2007/0222612 A1 | 9/2007 | Krisl |
| 2008/0257692 A1 | 10/2008 | Wallace |
| 2013/0146672 A1 | 6/2013 | DePaso |

*Primary Examiner* — William R Harp
(74) *Attorney, Agent, or Firm* — James T. Cronvich

(57) ABSTRACT

A conveyor belt having a sensor probe extending upward from an outer conveying surface into a mat of bulk products conveyed on the belt. The probe senses a condition of the product mat at a predetermined depth. The probe height above the conveying surface may be fixed or may be adjustable to be positioned at a critical depth within the product mat.

22 Claims, 2 Drawing Sheets

BULK-PRODUCT CONVEYOR WITH SENSOR

BACKGROUND

The invention relates generally to power-driven conveyors and more particularly to belt conveyors having sensors embedded in the conveyor belt.

Conveyor belts are used to convey bulk food products, such as corn and peas, through processing devices, such as blanchers, cookers, coolers, and freezers. The products rest on the conveyor belt's outer conveying surface in a mass. It is often important that the processing device process the product mass uniformly through its depth or that all products undergo at least a minimum level of processing. For example, a cooking process may require that the temperature at any point in the product mass reach a minimum level. In the case of a bed of product on a conveyor belt advancing through a cooker, products somewhere in the middle of the bed's depth are at a cold spot where the temperature reaches the minimum temperature level last. One way to ensure that the products at the cold spot of the bed are adequately heated is to overheat the products. But that wastes energy and affects the quality of the products by overcooking those outside the cold spot.

Thus, there is a need to improve the quality of bulk products conveyed through a processing device.

SUMMARY

This need and other needs are addressed by a conveyor embodying features of the invention. One version of such a conveyor comprises a carryway and a conveyor belt having an outer conveying surface supporting a layer of bulk products. The conveyor belt advances the layer of bulk products along the carryway. A sensor mounted in the conveyor belt has a sensor probe extending into the layer of bulk products above the outer conveying surface of the conveyor belt to detect a condition of the products. The sensor provides sensor signals that represent the condition of the products detected by the sensor probe. A transmitter mounted in the conveyor belt transmits the sensor signals to a remote location.

Another version of the conveyor comprises a conveyor belt having an outer conveying surface supporting a layer of bulk products and advancing the layer of bulk products along a carryway. A sensor mounted in the conveyor belt has a sensor probe extending into the layer of bulk products above the outer conveying surface of the conveyor belt to detect a condition of the products. The sensor provides sensor signals representing the condition of the products detected by the sensor probe. Probe-height adjustment means adjusts the height of the sensor probe above the outer conveying surface.

In another aspect of the invention, a method for measuring a condition of a mat of products conveyed on a conveyor belt comprises: (a) positioning a sensor probe mounted is a conveyor belt at a selected position within the depth of a mat of products conveyed on a conveying surface of the conveyor belt; (b) measuring a condition of the mat of products with the sensor probe; and (c) transmitting a signal indicative of the condition of the mat of products measured by the sensor probe remotely from the conveyor belt.

BRIEF DESCRIPTION OF THE DRAWINGS

These features and aspects of the invention, as well as its advantages, are described in more detail in the following description, appended claims, and accompanying drawings, in which:

DETAILED DESCRIPTION

Figure 1:
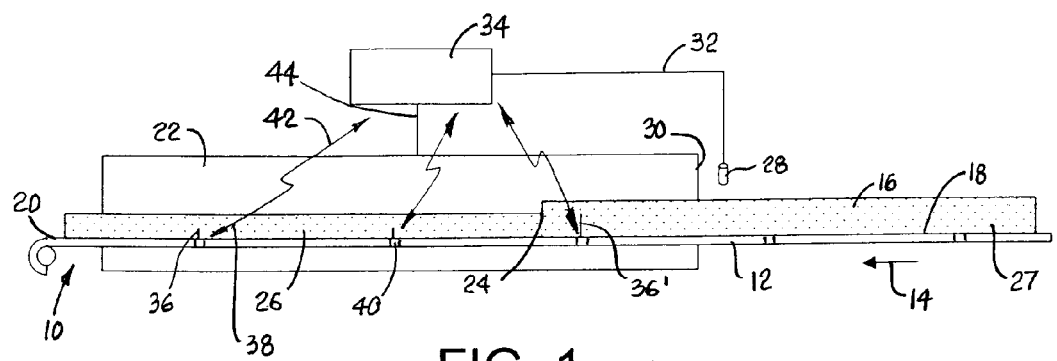
FIG. 1 is a partial block diagram, partial side elevation view of bulk products being conveyed through a processing device by a belt conveyor embodying features of the invention.

FIG. 1 shows a conveyor embodying features of the invention conveying a mat of bulk products through a process. The conveyor 10 includes a conveyor belt 12 advancing in a conveying direction 14. The belt supports a mat 16, or layer, of bulk products, such as vegetables, on an outer conveying surface 18 and conveys the product mat along an upper carryway 20 through a processing station 22, such as a blanching tunnel. The product mat 16 shown has a step change in the depth of the mat at a position 24 along the length of the blancher. In this example, the product mat has a shallower depth 26 downstream of the step position 24 and a greater depth 27 upstream. A product-depth sensor 28 near the entrance end 30 of the processing station 22 measures the depth of the product mass by sensing its height or its weight, for example. For sensing height, a photo eye or other optical sensor, a proximity sensor, or a flapper with a rheostat, potentiometer, or angle encoder on its pivot shaft could be used. Alternative product-depth sensors include scales and weight sensors to weigh the product load and visioning systems to monitor product depth. The product-depth sensor 28 sends a load signal 32 to a controller 34, such as a programmable logic controller or other programmed control device.

The conveyor belt 12 has sensor probes 36, 36' extending upward from its outer conveying surface 18 along the carryway 20. The sensor probes, which may be temperature probes, such as thermocouple devices or thermisters, chemical sensors, such as chlorine sensors, or moisture sensors sensing humidity, extend into the product mat to a height near the critical depth of the product mat. The critical depth is the depth position in a mat of known depth at which the condition sensed is critical in determining the quality of the treatment of the product by the process throughout the full depth of the mat. In the case of a blancher, the critical depth is the cold spot, the depth at which the temperature of the product is lowest. The cold spot is somewhere between the top of the product mat and the outer conveying surface of the belt. The sensor probe, in this case, a temperature probe 36, is positioned at a lower level in the shallower mat 26 than the temperature probe 36' in the deeper mat 27. The controller uses the mat depth measured by the product-depth sensor 28 to send height-adjustment signals 38 wirelessly to receivers in electronic modules 40 located in the belt near each sensor probe. The electronic modules adjust the heights of the probes 36, 36' based on the height-adjustment signals. In this way, the sensor probes are positioned to sense a condition at a critical depth of the product mat. Transmitters in the electronic modules 40 send sensor-probe signals 42 to the remotely located controller 34 indicating the condition of the product mat at the critical depth, such as the temperature at the cold spot. The controller can then control the process over process-control lines 44. For example, in the case of a blancher, the controller can increase or decrease the temperature of the blancher.

Figure 2:
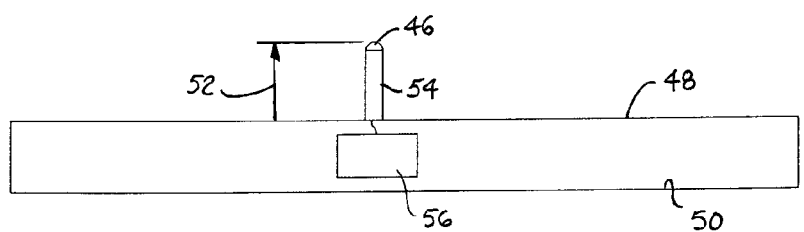
FIG. 2 is a side elevation view of a portion of a conveyor belt with a fixed-height sensor probe usable in the conveyor as in FIG. 1.

In some cases, a uniform or near-uniform product mat can be guaranteed. In those cases, a fixed-height sensor probe can be used. A fixed-height probe is shown in FIG. 2. The probe 46 extends upward from the outer conveying surface 48 of a conveyor belt 50 to a fixed height 52. The sensor probe 46 is supported and protected by a support, such as a sleeve 54. The probe is connected to an electronic module 56, which conditions the sensor signal and transmits the resulting data to the controller.

Figure 3:
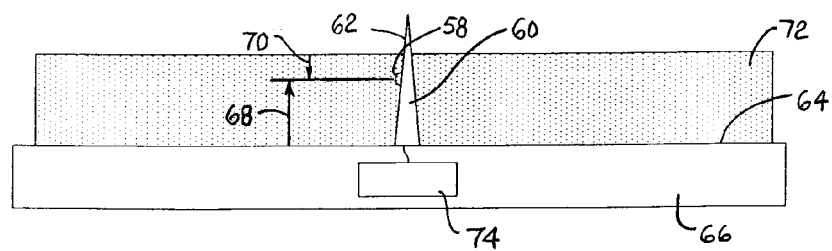
FIG. 3 is a side elevation view of a portion of a conveyor belt with a fixed-height sensor probe mounted in a flight usable in a conveyor as in FIG. 1.

Another fixed-height sensor probe 58 is shown in a flight 60 in FIG. 3. The probe 58 protrudes from a face 62 of the flight, which extends upward from the outer conveying surface 64 of a belt 66. The sensor probe is positioned at a fixed height 68 above the conveying surface at a known depth 70 in the product mat 72. An electronic module 74 in the belt 66 conditions the probe and transmits its sensor signals to the controller.

Figure 4:
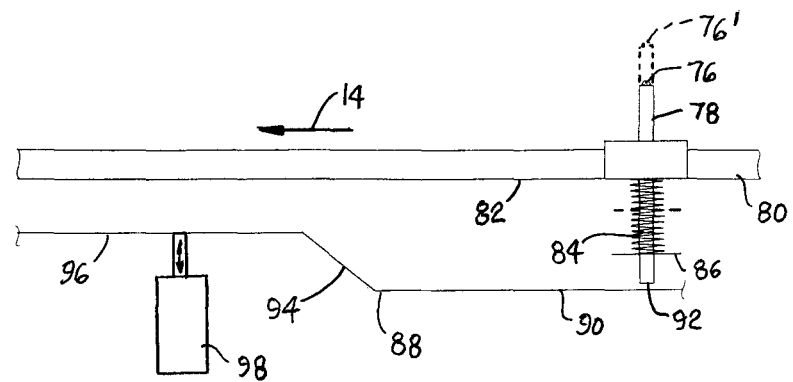
FIG. 4 is a side elevation view of a portion of a conveyor belt with a spring-loaded, adjustable-height sensor probe usable in a conveyor as in FIG. 1.

One version of an adjustable-height sensor probe is shown in FIG. 4. The probe 76, protected by a sleeve 78, extends upward from a conveyor belt 80. The sleeve extends below a bottom surface 82 of the belt. A coil spring 84 surrounds an upper portion of the sleeve below the belt. The spring is attached between the bottom surface 82 of the belt and a spring seat 86 affixed to the sleeve. A bearing surface 88 in the belt carryway has a first portion 90 at a low level out of contact with the bottom end 92 of the sleeve. This allows the probe 76 to retract to its lowest height under downward pressure from the spring. As the belt advances in the conveying direction 14, the bottom 92 of the sleeve, like a cam follower, rides up a ramp portion 94 to an upper horizontal portion 96 of the bearing surface 88. The sleeve 78 and the probe 76 are forced upward to a probe height indicated by the dashed-line probe 76'. The maximum probe height may be adjusted by a linear actuator 98 controlled by the controller.

Figure 5:
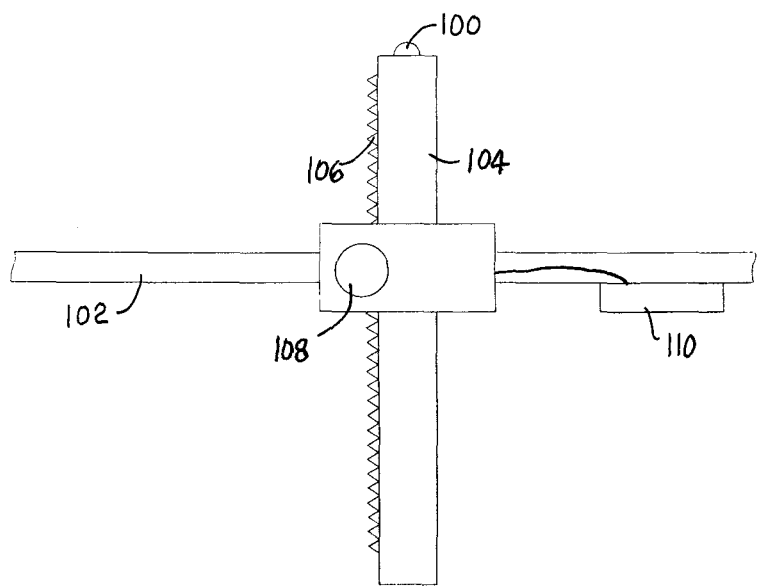
FIG. 5 is a side elevation view of a portion of a conveyor belt having a motor-driven, height-adjustable sensor probe usable in a conveyor as in FIG. 1.

Another adjustable-height probe is shown in FIG. 5. In this version, the height of the probe 100 is controlled by probe-height adjustment means within the belt rather than by an external bearing surface serving as a probe-height adjustment means in FIG. 4. The sensor probe 100 extends upward from a conveyor belt 102. A sleeve 104 has a set of gear teeth 106 along one side. The sleeve and gear teeth extend through the belt. A gear motor 108 rotates a pinion gear (not shown) that engages the rack of teeth on the sleeve to drive the sleeve and the probe up or down to a selected height above the belt. A nearby electronic module 110 conditions the sensor-probe signals, communicates with the controller, and powers and drives the motor to adjust the probe height.

What is claimed is:

1. A conveyor comprising:
   a carryway;
   a conveyor belt having an outer conveying surface supporting a layer of bulk products and advancing the layer of bulk products along the carryway;
   a sensor mounted in the conveyor belt and having a sensor probe extending into the layer of bulk products above the outer conveying surface of the conveyor belt to detect a condition of the products, the sensor providing sensor signals representing the condition of the products detected by the sensor probe;
   a transmitter mounted in the conveyor belt to transmit the sensor signals to a remote location.

2. A conveyor as in claim 1 wherein the conveyor belt has a flight extending upward from the outer conveying surface of the conveyor belt along the carryway and wherein the sensor probe is mounted in the flight.

3. A conveyor as in claim 1 further comprising a support upstanding from the outer conveying surface of the conveyor belt and supporting the sensor probe at a fixed height above the outer conveying surface.

4. A conveyor as in claim 1 further comprising probe-height adjustment means for adjusting the height of the sensor probe above the outer conveying surface.

5. A conveyor as in claim 4 wherein the probe-height adjustment means includes a motor embedded in the conveyor belt selectively actuated to raise and lower the sensor probe to a predetermined height into the layer of bulk products.

6. A conveyor as in claim 4 wherein the probe-height adjustment means includes an actuator proximate the conveyor belt to adjust the height of the sensor probe to a predetermined height within the layer of bulk products.

7. A conveyor as in claim 4 wherein the probe-height adjustment means includes a bearing surface that contacts a cam follower coupled to adjust the height of the sensor probe above the conveying surface.

8. A conveyor as in claim 4 further comprising a product-depth sensor providing a load signal indicating the depth of the layer of products and wherein the probe-height adjustment means adjusts the height of the sensor probe above the outer conveying surface as a function of the load signal.

9. A conveyor as in claim 1 wherein the sensor probe is a temperature probe detecting temperature.

10. A conveyor as in claim 1 wherein the sensor probe is a chemical probe detecting a predetermined chemical.

11. A conveyor as in claim 1 wherein the sensor probe is a moisture probe.

12. A conveyor comprising:
    a carryway;
    a conveyor belt having an outer conveying surface supporting a layer of bulk products and advancing the layer of bulk products along the carryway;
    a sensor mounted in the conveyor belt and having a sensor probe extending into the layer of bulk products above the outer conveying surface of the conveyor belt to detect a condition of the products, the sensor providing sensor signals representing the condition of the products detected by the sensor probe;
    probe-height adjustment means for adjusting the height of the sensor probe above the outer conveying surface.

13. A conveyor as in claim 12 wherein the probe-height adjustment means includes a motor embedded in the conveyor belt selectively actuated to raise and lower the sensor probe to a predetermined height into the layer of bulk products.

14. A conveyor as in claim 12 wherein the probe-height adjustment means includes an actuator proximate the conveyor belt to adjust the height of the sensor probe to a predetermined height within the layer of bulk products.

15. A conveyor as in claim 12 wherein the probe-height adjustment means includes a bearing surface that contacts a cam follower coupled to adjust the height of the sensor probe above the conveying surface.

16. A conveyor as in claim 12 further comprising a transmitter mounted in the conveyor belt to transmit the sensor signals to a remote location.

17. A conveyor as in claim 12 further comprising a product-depth sensor providing a load signal indicating the depth of the layer of products and wherein the probe-height adjustment means adjusts the height of the sensor probe above the outer conveying surface as a function of the load signal.

18. A conveyor as in claim 12 wherein the sensor probe is a temperature probe detecting temperature.

19. A conveyor as in claim 12 wherein the sensor probe is a chemical probe detecting a predetermined chemical.

20. A conveyor as in claim 12 wherein the sensor probe is a moisture probe.

21. A method for measuring a condition of a mat of products conveyed on a conveyor belt, comprising:
- positioning a sensor probe mounted in a conveyor belt at a selected position within the depth of a mat of products conveyed on a conveying surface of the conveyor belt;
- measuring a condition of the mat of products with the sensor probe;
- transmitting a signal indicative of the condition of the mat of products measured by the sensor probe remotely from the conveyor belt.

22. The method of claim 21 further comprising:
- determining the depth of the mat of products conveyed on the conveyor belt; and
- adjusting the height of the sensor probe above the conveying surface based on the depth of the mat of products.

* * * * *